Nov. 17, 1959  J. D. LESLIE ET AL  2,913,066
VEHICLE DOOR AND TRANSMISSION INTERLOCK
Filed July 14, 1958  3 Sheets-Sheet 1
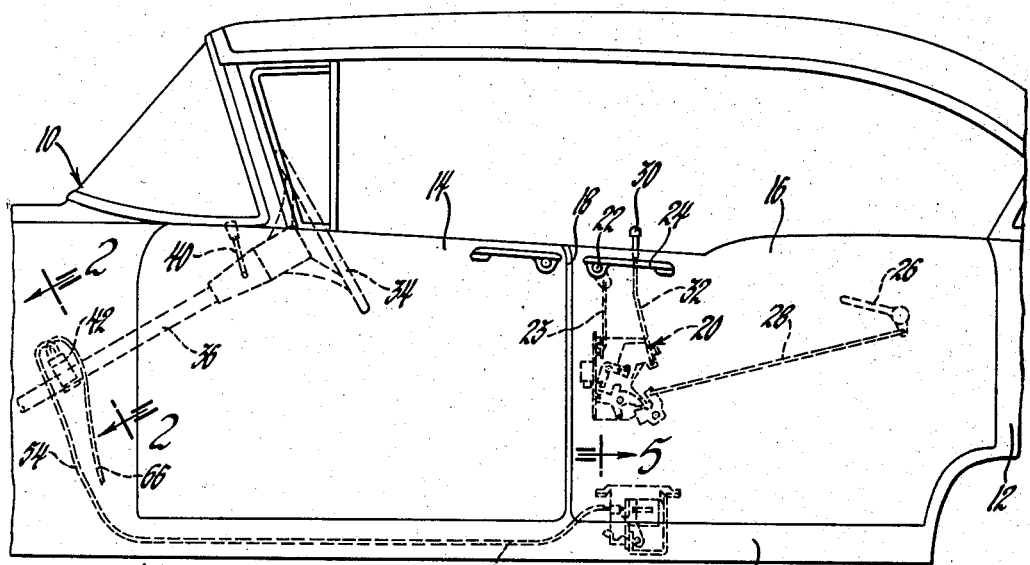
INVENTORS
James D. Leslie &
Gerhard Rehkugler
BY
W. S. Pettigrew
ATTORNEY Nov. 17, 1959     J. D. LESLIE ET AL     2,913,066
VEHICLE DOOR AND TRANSMISSION INTERLOCK
Filed July 14, 1958     3 Sheets-Sheet 2
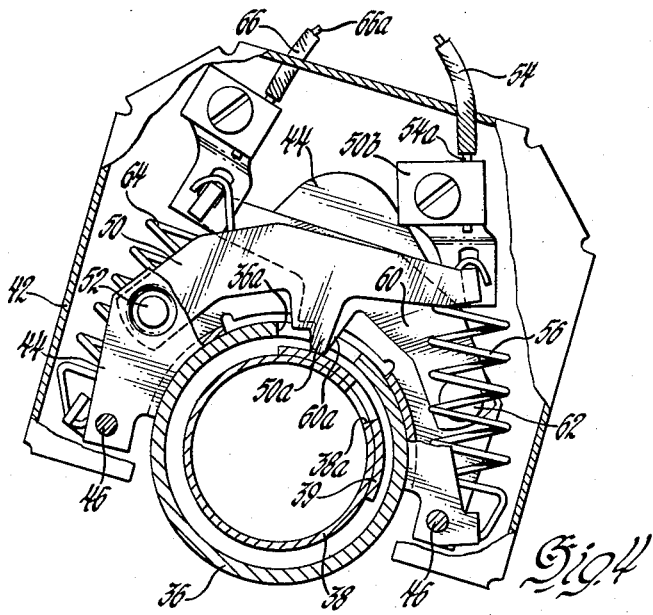
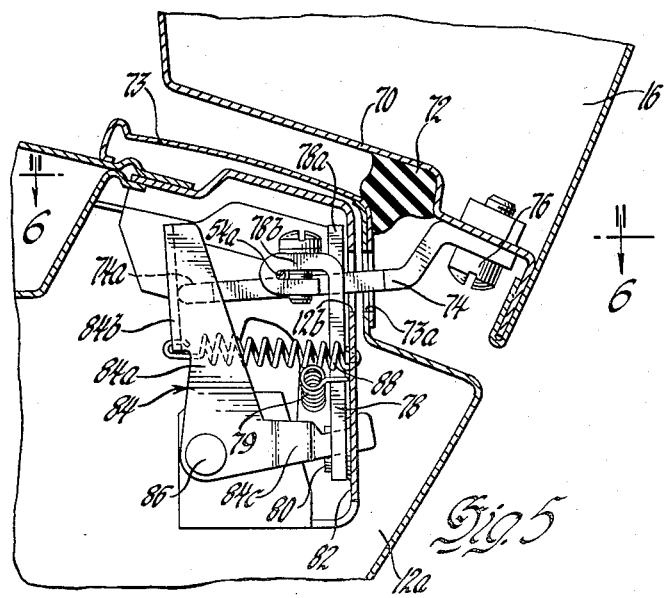
INVENTORS
James D. Leslie &
BY Gerhard Rehkugler
W. S. Pettigrew
ATTORNEY

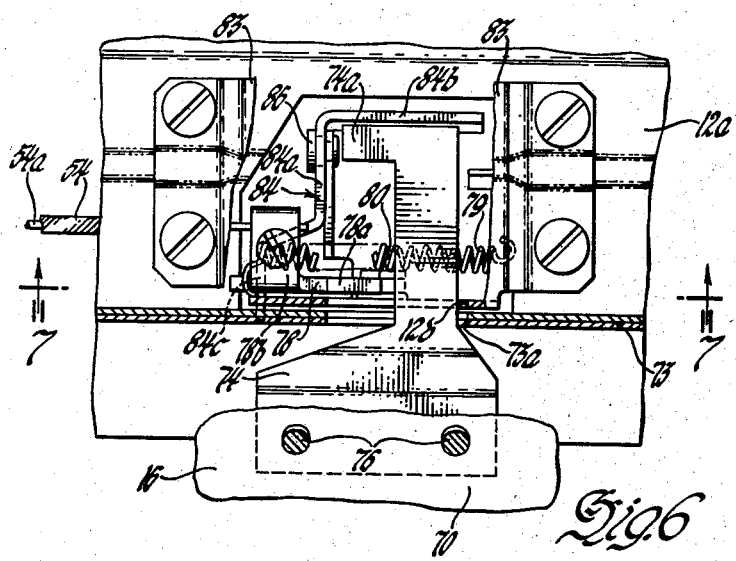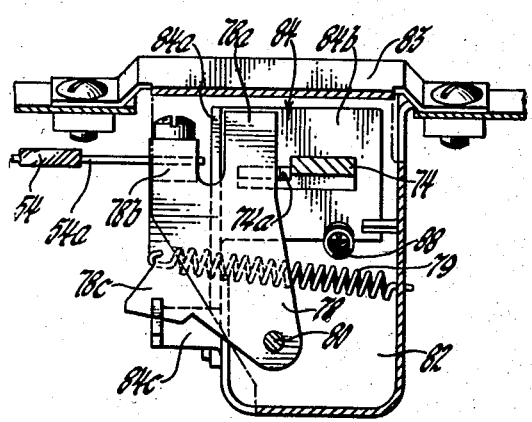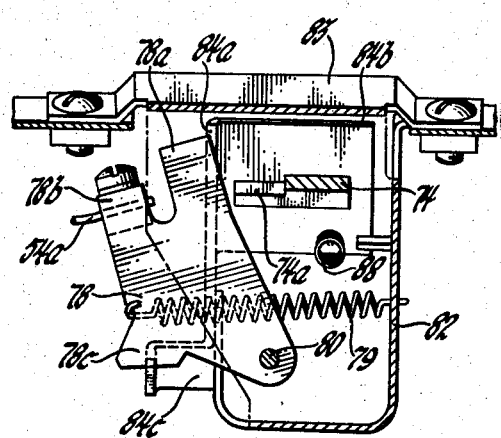

United States Patent Office 2,913,066
Patented Nov. 17, 1959

2,913,066

VEHICLE DOOR AND TRANSMISSION INTERLOCK

James D. Leslie, Birmingham, and Gerhard Rehkugler, Warren, Mich., assignors to General Motors Corporation, Detroit, Mich., a corporation of Delaware Application July 14, 1958, Serial No. 748,513

9 Claims. (Cl. 180—82)

This invention relates to a door safety lock, and more particularly to a safety vehicle door and transmission interlock.

One feature of the invention is that it provides an improved safety lock for an automobile door; a further feature of the invention is that it provides a safety lock which blocks the automobile transmission selector lever in neutral position whenever a door is open; another feature of the invention is that it blocks the door with which it is associated in closed position against opening movement whenever the transmission selector lever is in a drive position; still a further feature of the invention is that it comprises a detent having a foot adapted to block rotary movement of the transmission selector sleeve from neutral to a drive position whenever a door is opened; yet a further feature of the invention is that it provides a striker on the door and a blocking lever on the body adapted to engage the striker and block opening movement of the door whenever the transmission selector lever is in a drive position, and control means interconnecting the detent and the blocking lever whereby the transmission selector means is blocked in neutral position when the door is opened, and the door is blocked in closed position when the transmission selector is in a drive position.

Other features and advantages will be apparent from the following description and from the drawings, in which:

Fig. 1 is a fragmentary side elevational view of an automobile having the improved safety door lock, underlying structure being shown in broken lines;

Fig. 2 is an enlarged transverse section through the steering column taken along the line 2—2 of Fig. 1 and showing the transmission selector blocking means in blocking position;

Fig. 3 is a section taken along the line 3—3 of Fig. 2;

Fig. 4 is a section similar to Fig. 2 but showing the parts in unblocking position;

Fig. 5 is an enlarged transverse section through a portion of the rear door and body rocker taken along the line 5—5 of Fig. 1 and showing the door blocking means in blocking position;

Fig. 6 is a horizontal section taken along the line 6—6 of Fig. 5;

Fig. 7 is a section taken along the line 7—7 of Fig. 6; and

Fig. 8 is a view similar to Fig. 7 but showing the parts in unblocking position.

The modern trend in automobile styling is toward lower roofs and larger window areas. These features have been provided for in some cases by the removal of the upper portion of the center structural body pillar as may be seen in the illustration of the four-door hardtop body style in Fig. 1. Removal of the upper portion of the pillar has made it necessary to thicken and reinforce the lower portion of the pillar, which tends to cut down entrance room through the rear door, particularly if the rear door is hinged on the center pillar. Hinging the door at its rear edge and latching it to the center pillar provides increased entrance room to the rear passenger compartment. However, if a door is hinged at its rear edge and is inadvertently opened while the automobile is moved, it will swing into the wind with the consequent danger that the person who has opened the door may be pulled out of the passenger compartment. This invention provides a novel means for blocking the rear door against opening movement when the automobile transmission selector lever is in a drive position and conversely for blocking the transmission selector lever in neutral position so that it cannot be moved into a drive position if a rear door is open.

The copending application of Daniel M. Adams et al., filed March 25, 1957, as Serial No. 648,209, and entitled, "Automobile Door Latching System," illustrates an electrical means for accomplishing this function. The present invention provides a simplified form of mechanical means for interconnecting a transmission selector blocking device and a door blocking device so that a rear door cannot be opened when the transmission selector is in a drive position and the transmission selector cannot be shifted from neutral to a drive position when one of the rear doors is open.

Referring now more particularly to the drawings, 10 represents an automobile having a body 12 with front and rear doors 14 and 16, respectively. The front door 14 is hingedly mounted on the body at the front edge of the door is conventional manner (not shown) and is latched at its rear edge to a center pillar 18 by a latch (not shown) which may be of the type shown in Leslie Patent 2,796,276. The rear door 16 is hinged in conventional manner (not shown) at its rear edge to the automobile body rear quarter pillar and is latched at its front edge to the center pillar 18 by a latch designated generally as 20 which may be similar to the latch shown in Leslie, 2,796,276. The door 16 may be opened from outside the automobile by an outside push button 22 which is connected to the latch by a rod 23. The push button 22 is slidably mounted in a gripping handle 24 which is fixedly carried on the door. The door may be opened from the inside by a turn handle 26 mounted on the door and connected by a rod 28 to the door latch. A conventional garnish molding button 30 is mounted on the door and connected to the latch by a rod 32 for locking the door from inside the car.

In the front passenger compartment a steering wheel 34 is mounted on a steering column 36 which extends through the fire wall that separates the passenger compartment from the engine compartment. Transmission selector means carried by the steering column comprises a movable shaft here shown as a sleeve 38 coaxially mounted inside the steering column for rotation about its longitudinal axis between a neutral position and one or more drive positions. Rotation of the sleeve 38 is controlled in conventional manner by a selector lever 40 projecting from the steering column adjacent the steering wheel 34. In a manual gear shift arrangement the transmission selector means may include a movable shaft mounted outside the steering column.

Inside the engine compartment a housing 42 is mounted on the steering column and a frame or support 44 is carried by a plurality of screws 46 in the housing. The frame 44 pivotally supports a pair of detents, each adapted to block rotational movement of the sleeve 38, one detent controlling the left rear door 16 of the automobile and the other detent controlling the right rear door of the automobile. The detent for controlling the left rear door is designated by the reference character 50 and is pivotally mounted at 52 on the frame 44. A blocking tooth 50a projects downwardly from the detent through a slot 36a in the steering column 36 and into a blocking notch 38a formed in the cylindrical wall of the sleeve 38 and in a reinforcing member 39 secured to and forming a functional part of the sleeve 38. The parts are so arranged that the blocking tooth 50a is aligned with the notch 38a only when the sleeve is in a position of rotation corresponding to neutral condition of the transmission. At its free end the detent 50 has a clip 50b to which is secured the end of a cable shown as a Bowden wire 54a which projects from a fixedly mounted sheath 54. A tension spring 56 is connected between the free end of the detent 50 and the frame 44 to urge the blocking tooth 50a toward blocking engagement in the notch 38a of the sleeve. As seen in Fig. 1, the Bowden wire 54a extends to a door blocking device in the left rear door 16 of the automobile.

A similar detent for controlling the right door (not shown) of the automobile is indicated at 60, this detent being mounted on the frame at 62 and having a blocking tooth 60a (see Fig. 4) extending through the slot 36a in the steering column and adapted to enter the notch 38a to block rotational movement of the sleeve 38. A spring 64 urges the detent 60 toward blocking position and the detent is connected to a Bowden wire 66a which extends through a stationary sheath 66. While the door blocking structure for the right-hand door is not shown in the drawings, it is similar in construction and operation to the left-hand door blocking structure presently to be described.

Referring now more particularly to Figs. 5 through 8, the door 16 terminates in a lower jamb face 70 which carries a weather strip 72 for sealing engagement with a scuff plate 73 mounted on the upper jamb face of the body rocker 12a. A striker member 74 is secured by bolts 76 to the jamb face 70 of the door and projects inwardly of the automobile body through openings 73a and 12b in the scuff plate and body rocker. As shown in Figs. 6, 7 and 8, the striker member 74 has a hook or blocking arm 74a at its free end. A blocking lever 78 is pivotally mounted at 80 on a support bracket 82 having a base 83 bolted to the rocker panel. This lever has an upwardly projecting blocking arm 78a and a clip portion 78b to which the other end of the Bowden wire 54a is secured, and a spring 79 is connected between the lever 78 and the bracket 82 to urge the lever 78 in a clockwise direction (Figs. 7 and 8) toward blocking position to counteract any whipping action of the cable 54a which may occur due to road vibration. When the door is closed the blocking lever 78 is spaced from the blocking arm 74a of the striker as shown in Fig. 6. This spacing provides a time delay in the blocking action when it is attempted to open the door. It might happen that the driver of the automobile would shift the transmission selector means from neutral to a drive position while substantially simultaneously an occupant of the rear passenger compartment attempted to open the door. Because the blocking action does not occur until the portion 74a of the striker moves outward through the space shown in Fig. 6, the lever 78 would have time to swing to blocking position after the door opening movement started, and thus prevent the door from being opened in the event of such simultaneous operation of the transmission selector and the door. An operating bell crank lever designated generally as 84 is pivotally mounted on a stud 86 on a right angular extension of the bracket 82. An upwardly extending arm 84a of this bell crank terminates in a right angular flange 84b adapted to engage the free end of the striker, a tension spring 88 urging the bell crank in a clockwise direction as the parts appear in Fig. 5 so that the flange 84b is drawn toward the end of the striker member. A generally horizontally projecting arm 84c on the bell crank lever 84 underlies a tab 78c on the blocking lever to hold the blocking lever in blocking position so long as the door 16 is closed.

In Figs. 4 and 7, the transmission selector blocking means and the door blocking means are shown in the position they would assume when the car is being driven with the doors closed. In Fig. 4 the sleeve 38 which forms part of the transmission selector means has been rotated to a drive position so that the blocking notch 38a in the wall thereof is out of alignment with both of the detents 50 and 60. The blocking foot of each of these detents rides on the surface of the reinforcing member 39 which is mounted on the sleeve 38. When the transmission selector blocking means is in this position and the doors are closed, the striker member 74 holds the door blocking means in the position of Fig. 7 wherein the arm 78a of the blocking lever lies within the hook or blocking portion of the striker 74 so that upon attempted opening movement of the door, the hook or blocking arm 74a of this striker will abut the blocking lever and these parts will prevent the door from being opened. Since the detent 50 is held up on the surface of the sleeve 38 there is no pull on the cable 54a to swing the blocking lever 78 out of the way when it is released by the arm 84c of the operating lever. In other words, it is not possible to open the door 16 so long as the transmission selector means is in a drive position.

If the transmission selector is shifted to a neutral position, the sleeve 38 will be rotated to the position of Fig. 2 where the notch 38a is in alignment with the blocking teeth of both of the detents 50 and 60 so that the springs 56 and 64 will urge the respective detents toward blocking relation, i.e., will attempt to pull the detent teeth down into the notch 38a. But so long as both rear doors remain closed, neither detent tooth will be able to move. Referring to Figs. 5 and 7, the operating lever 84 is held in the position shown by engagement of the flange 84b with the end of the striker and the arm 84c of this lever underlies the blocking lever tab 78c. The detent 50 cannot swing down into blocking engagement with the transmission selector tube notch 38a without swinging the operating lever because of the interconnection between these two parts by the Bowden wire 54a, and the transmission will remain unblocked. However, now if the door 16 is swung toward open position, the spring 88 will cause the operating lever 84 to follow, swinging its blocking arm 84c downwardly before the hook portion 74a of the striker engages the blocking lever. Removal of the blocking arm 84c from blocking relation with the blocking lever 78 will permit the blocking lever to swing out of the way to the position of Fig. 8 through force exerted by the spring 56 through the Bowden wire 54a. With the parts in the position of Fig. 8, the door is permitted to open, and since the detent 50 is now swung down into blocking relation with the transmission selector tube, as shown in Fig. 2, the transmission selector is blocked in neutral position.

When the door is closed, the striker will engage the flange 84b on the operating lever and swing the operating lever counterclockwise in Fig. 5 so that its arm 84c picks up the operating lever 78 and swings it back to the blocking position of Fig. 7. During this swinging movement, the operating lever through the Bowden wire 54a will pull the detent 50 against the force of spring 56 out of the blocking notch 38a and to the position of Fig. 4 so that the transmission selector can be placed in a drive position. The tooth of the detent lever is held out of the notch 38a by the cable 54a against the force of the spring 56 when the blocking lever 78 is in the blocking position of Fig. 7 and the spring 56 exerts force on the blocking lever 78 through the cable 54a only when the blocking tooth 50a of the detent lever 50 is aligned with the notch 38a so that the blocking lever 78 remains in blocking position when the transmission selector means is in a drive position.

While we have shown and described one embodiment of our invention, it is capable of many modifications. Changes, therefore, in the construction and arrangement may be made without departing from the spirit and scope of the invention as set forth in the appended claims.

What is claimed is:

1. In combination with an automobile body, transmission selector means movable between drive and neutral positions, said means including a sleeve mounted for rotation about its longitudinal axis and a selector lever for rotating said sleeve, said sleeve having a blocking notch therein; a door mounted for swinging movement between open and closed positions; means for blocking said transmission selector means from being moved out of neutral position, comprising a pivotally mounted detent lever having a blocking tooth adapted to enter said notch to block rotation of said sleeve when said sleeve is in neutral position, said tooth riding on the surface of said sleeve out of said notch when the sleeve is in a drive position, and a spring urging said detent toward blocking position; means for blocking said door in closed position comprising a striker member on said door, said striker having a blocking arm, a blocking lever pivotally mounted on said body for movement between a blocking position spaced from but in the path of movement of the blocking arm of said striker when the door is swung toward open position and another position out of said path of movement, and an operating lever pivotally mounted on said body and having first and second arms, the first of which engages said striker when the door is closed to maintain the second arm in engagement with said blocking lever and hold said blocking lever in blocking position when the door is closed; and a cable interconnecting said detent lever and said blocking lever, the tooth of said detent lever being held out of said notch by said cable against the force of said spring when said blocking lever is in blocking position, said spring exerting force on said blocking lever through said cable only when the blocking tooth of the detent lever is aligned with said notch, whereby no force is exerted on the blocking lever and the blocking lever remains in blocking position when the transmission selector means is in a drive position and the detent tooth is held out of said notch by said blocking lever and cable when the door is closed.

2. In combination with an automobile body, transmission selector means movable between drive and neutral positions, said means including a sleeve mounted for rotation about its longitudinal axis and a selector lever for rotating said sleeve, said sleeve having a blocking notch therein; a door mounted for swinging movement between open and closed positions; means for blocking said transmission selector means from being moved out of neutral position, comprising a movably mounted detent lever having a blocking tooth adapted to enter said notch to block rotation of said sleeve when said sleeve is in neutral position, said tooth riding on the surface of said sleeve out of said notch when the sleeve is in a drive position, and spring means urging said detent toward blocking position; means for blocking said door in closed position comprising a striker member fixedly mounted on said door, said striker having a blocking arm, a blocking lever pivotally mounted on said body for movement between a blocking position spaced from but in the path of movement of the blocking arm of said striker when the door is swung toward open position and another position out of said path of movement, and an operating lever movably mounted on said body and having first and second arms, the first of which engages said striker when the door is closed to maintain the second arm in engagement with said blocking lever and hold said blocking lever in blocking position when the door is closed; and a cable interconnecting said detent lever and said blocking lever, the both of said detent levers being held out of said notch by said cable against the force of said spring when said blocking lever is in blocking position, said spring exerting force on said blocking lever through said cable only when the blocking tooth of said lever is aligned with said notch, whereby no force is exerted on the blocking lever and the blocking lever remains in blocking position when the transmission selector means is in a drive position and the detent tooth is held out of said notch by said blocking lever and cable when the door is closed.

3. In combination with an automobile body, transmission selector means movable between drive and neutral positions, said means including a rotatable sleeve having a blocking notch therein; a door mounted for swinging movement between open and closed positions; means for blocking said transmission selector means from being moved out of neutral position, comprising a movably mounted detent lever having a blocking tooth adapted to enter said notch to block rotation of said sleeve when said sleeve is in neutral position, said tooth riding on the surface of said sleeve out of said notch when the sleeve is in a drive position, and spring means urging said detent toward blocking position; means for blocking said door in closed position comprising a striker member on said door, a blocking lever pivotally mounted on said body for movement between a blocking position spaced from but in the path of movement of said striker when the door is swung toward open position and another position out of said path of movement, and an operating lever pivotally mounted on said body and having first and second arms, the first of which engages said striker when the door is closed to maintain the second arm in engagement with said blocking lever and hold said blocking lever in blocking position when the door is closed; and a cable interconnecting said detent lever and said blocking lever, the tooth of said detent lever being held out of said notch by said cable against the force of said spring when said blocking lever is in blocking position, said spring exerting force on said blocking lever through said cable only when the blocking tooth of the detent lever is aligned with said notch, whereby no force is exerted on the blocking lever and the blocking lever remains in blocking position when the transmission selector means is in a drive position and the detent tooth is held out of said notch by said blocking lever and cable when the door is closed.

4. In combination with an automobile body, transmission selector means movable between drive and neutral positions, said means including a rotatable sleeve having a blocking notch therein; a door mounted for swinging movement between open and closed positions; means for blocking said transmission selector means from being moved out of neutral position, comprising a movably mounted detent lever having a blocking tooth adapted to enter said notch to block rotation of said sleeve when the sleeve is in neutral position, said tooth riding on the surface of said sleeve out of said notch when the sleeve is in a drive position, and spring means urging said detent toward blocking position; means for blocking said door in closed position comprising a striker member and a blocking lever member, said two members being mounted one on said door and one on said body, the blocking lever being movable between a blocking position spaced from but in the path of said striker when the door is swung toward open position and another position out of said path, and a pivotally mounted operating lever having first and second arms, the first of which engages said striker when the door is closed to maintain the second arm in engagement with said blocking lever and hold said blocking lever in blocking position when the door is closed; and a cable interconnecting said detent lever and said blocking lever, the tooth of said detent lever being held out of said notch by said cable against the force of said spring when said blocking lever is in blocking position, said spring exerting force on said blocking lever through said cable only when the blocking tooth of the detent lever is aligned with said notch, whereby no force is exerted on the blocking lever and the blocking lever remains in blocking position when the transmission selector means is in a drive position and the detent tooth is held out of said notch by said blocking lever and said cable when the door is closed.

5. In combination with an automobile body, transmission selector means movable between drive and neutral positions, said means including a rotatable sleeve having a blocking notch therein; a door mounted for swinging movement between open and closed positions; means for blocking said transmission selector means from being moved out of neutral position comprising a movably mounted detent lever having a blocking tooth adapted to enter said notch to block rotation of said sleeve when said sleeve is in neutral position, said tooth riding on the surface of said sleeve out of said notch when the sleeve is in a drive position, and spring means urging said detent toward blocking position; means for blocking said door in closed position comprising a striker member, a blocking lever mounted for movement between a blocking position in the path of movement of said striker when the door is swung toward open position and another position out of said path of movement, and a movably mounted operating lever having first and second arms, the first of which is engaged by said striker when the door is closed to maintain the second arm in engagement with said blocking lever and hold said blocking lever in blocking position when the door is closed; and a cable interconnecting said detent lever and said blocking lever, the tooth of said detent lever being held out of said notch by said cable against the force of said spring when said blocking lever is in blocking position, said spring exerting force on said blocking lever through said cable only when the blocking tooth of the detent lever is aligned with said notch, whereby no force is exerted on the blocking lever and the blocking lever remains in blocking position when the transmission selector means is in a drive position.

6. In combination with an automobile body, transmission selector means movable between drive and neutral positions; a door mounted for movement between open and closed positions; means for blocking said transmission selector means from being moved out of neutral position comprising a movably mounted detent lever having a blocking tooth adapted to engage said transmission selector means when the transmission selector means is in neutral position, and spring means urging said detent lever toward blocking position; means for blocking said door in closed position comprising a striker member, a blocking lever pivotally mounted for movement between a blocking position in the path of movement of said striker member when the door is swung toward open position and another position out of said path of movement and a movably mounted operating lever having first and second arms, the first of which is engaged by said striker when the door is closed to maintain the second arm in engagement with said blocking lever and hold said blocking lever in blocking position when the door is closed; and a cable interconnecting said detent lever and said blocking lever, the tooth of said detent lever being held out of blocking engagement with said transmission selector means by said cable against the force of said spring means when said blocking lever is in blocking position, said spring means exerting force on said blocking lever through said cable only when the blocking tooth of the detent lever is located for blocking engagement with said transmission selector means, whereby no force is exerted on the blocking lever and the blocking lever remains in blocking position when the transmission selector means is in drive position.

7. In combination with an automobile body, transmission selector means movable between drive and neutral positions; a door mounted for movement between open and closed positions; means for blocking said transmission selector means from being moved out of neutral position comprising a movably mounted detent lever having a blocking tooth adapted to engage said transmission selector means and block it in neutral position, and spring means urging said detent toward blocking position; means for blocking said door in closed position comprising a striker member and a blocking lever mounted for movement between a blocking position in the path of movement of said striker when the door is swung toward open position and another position out of said path of movement and means operated by said striker for holding said blocking lever in blocking position when the door is closed; and a mechanical control device comprising a cable interconnecting said detent lever and said blocking lever, the tooth of said detent lever being held out of blocking engagement with said transmission selector means by said cable against the force of said spring means when the blocking lever is in blocking position, said spring exerting force on said blocking lever through said cable only when the blocking tooth of the detent lever is located for engagement with said transmission selector means whereby no force is exerted on the blocking lever and the blocking lever remains in blocking position when the transmission selector means is in drive position.

8. In combination with an automobile body, transmission selector means movable between drive and neutral positions, said means including a movably mounted shaft and a selector lever for moving said shaft, said shaft having blocking means thereon; a door mounted on the automobile body for swinging movement between open and closed positions; means for blocking said transmission selector means from being moved out of neutral position, comprising a pivotally mounted detent lever adapted to engage said blocking means to block movement of said shaft when said transmission selector means is in neutral position, said detent lever being out of engagement with said blocking means when the shaft is in a drive position, and spring means urging said detent lever toward blocking position; means for blocking said door in closed position comprising a striker member on said door, said striker having a blocking arm, a blocking lever pivotally mounted on said body for movement between a blocking position spaced from but in the path of movement of the blocking arm of said striker when the door is swung toward open position and another position out of said path of movement, and an operating lever pivotally mounted on said body and having first and second arms, the first of which engages said striker when the door is closed to maintain the second arm in engagement with said blocking lever and hold said blocking lever in blocking position when the door is closed; and a cable interconnecting said detent lever and said blocking lever, said detent lever being held out of engagement with said blocking means by said cable against the force of said spring when said blocking lever is in blocking position, said spring exerting force on said blocking lever through said cable only when the detent lever is in position to engage said blocking means, whereby no force is exerted on the blocking lever and the blocking lever remains in blocking position when the transmission selector means is in a drive position and the detent lever is held out of engagement with the blocking means by said blocking lever and cable when the door is closed.

9. In combination with an automobile body, transmission selector means movable between drive and neutral positions, said means including a movably mounted shaft and a selector lever for moving said shaft, said shaft having a blocking notch therein; a door mounted for swinging movement between open and closed positions; means for blocking said transmission selector means from being moved out of neutral position comprising a movably mounted detent lever having a blocking tooth adapted to enter said notch to block movement of said shaft when said transmission selector means is in neutral position, said tooth riding on the surface of said shaft out of said notch when the transmission selector means is in a drive position, and spring means urging said detent toward blocking position; means for blocking said door in closed position comprising a striker member and a blocking lever member, said two members being mounted one on said door and one on said body, the blocking lever being movable between a blocking position spaced from but in the path of said striker when the door is swung toward open position and another position out of said path, and a pivotally mounted operating lever having first and second arms, the first of which engages said striker when the door is closed to maintain the second arm in engagement with said blocking lever and hold said blocking lever in blocking position when the door is closed; and a cable interconnecting said detent lever and said blocking lever, the tooth of said detent lever being held out of said notch by said cable against the force of said spring when said blocking lever is in blocking position, said spring exerting force on said blocking lever through said cable only when the blocking tooth of the detent lever is aligned with said notch, whereby no force is exerted on the blocking lever and the blocking lever remains in blocking position when the transmission selector means is in a drive position and the detent tooth is held out of said notch by said blocking lever and said cable when the door is closed.

References Cited in the file of this patent

UNITED STATES PATENTS

| | | |
|---|---|---|
| 1,664,042 | McGinley | Mar. 27, 1928 |
| 2,626,003 | Kutzer | Jan. 20, 1953 |
| 2,717,169 | Lindbloom | Sept. 6, 1955 |
| 2,823,755 | Hall | Feb. 18, 1958 |

FOREIGN PATENTS

| | | |
|---|---|---|
| 408,712 | Great Britain | Apr. 19, 1934 |